(12) United States Patent
Casati et al.

(10) Patent No.: US 8,236,866 B2
(45) Date of Patent: Aug. 7, 2012

(54) HIGH RESILIENCE FOAMS

(75) Inventors: Francois M. Casati, Pfaffikon (CH); Jean-Marie Sonney, Schindellegi (CH)

(73) Assignee: Dow Global Technologies LLC, Midland, MI (US)

( * ) Notice: Subject to any disclaimer, the term of this patent is extended or adjusted under 35 U.S.C. 154(b) by 269 days.

(21) Appl. No.: 12/599,998

(22) PCT Filed: May 7, 2008

(86) PCT No.: PCT/US2008/062810
§ 371 (c)(1),
(2), (4) Date: Nov. 13, 2009

(87) PCT Pub. No.: WO2008/144224
PCT Pub. Date: Nov. 27, 2008

(65) Prior Publication Data
US 2010/0249260 A1 Sep. 30, 2010

Related U.S. Application Data

(60) Provisional application No. 60/930,332, filed on May 15, 2007.

(51) Int. Cl.
C08G 18/28 (2006.01)

(52) U.S. Cl. ........ 521/130; 521/159; 521/170; 521/172; 521/173; 521/174

(58) Field of Classification Search .......... 521/130, 521/159, 170, 172, 173, 174
See application file for complete search history.

(56) References Cited

U.S. PATENT DOCUMENTS

| | | | |
|---|---|---|---|
| 4,423,162 A | 12/1983 | Peerman et al. | |
| 4,496,487 A | 1/1985 | Peerman et al. | |
| 4,508,853 A | 4/1985 | Kluth et al. | |
| 4,543,369 A | 9/1985 | Peerman et al. | |
| 4,633,021 A | 12/1986 | Hanes | |
| 4,731,486 A | 3/1988 | Abatjoglou et al. | |
| 5,672,636 A | 9/1997 | Horn et al. | |
| 6,107,403 A | 8/2000 | Shepler | |
| 6,433,121 B1 | 8/2002 | Petrovic et al. | |
| 6,686,435 B1 | 2/2004 | Petrovic et al. | |
| 6,740,687 B2 * | 5/2004 | Niederoest et al. | 521/130 |
| 7,615,658 B2 | 11/2009 | Lysenko et al. | |
| 2002/0058774 A1 | 5/2002 | Kurth et al. | |
| 2004/0242910 A1 | 12/2004 | Dwan 'Isa et al. | |
| 2005/0070620 A1 | 3/2005 | Herrington et al. | |
| 2006/0041155 A1 | 2/2006 | Casper | |
| 2006/0041156 A1 | 2/2006 | Casper et al. | |
| 2006/0041157 A1 | 2/2006 | Petrovic et al. | |
| 2006/0229375 A1 | 10/2006 | Hsiao et al. | |
| 2006/0235100 A1 | 10/2006 | Kaushiva et al. | |
| 2006/0270747 A1 * | 11/2006 | Griggs | 521/172 |
| 2006/0293400 A1 | 12/2006 | Wiltz, Jr. et al. | |

FOREIGN PATENT DOCUMENTS

| | | |
|---|---|---|
| DE | 19936481 A1 | 2/2001 |
| EP | 106491 A2 | 4/1984 |
| EP | 485953 A2 | 5/1992 |
| EP | 539819 A2 | 5/1993 |
| EP | 747407 A1 | 12/1996 |
| WO | WO-00/14045 A1 | 3/2000 |
| WO | WO-01/04225 A1 | 1/2001 |
| WO | WO-01/58976 A1 | 8/2001 |
| WO | WO-2004/020497 A1 | 3/2004 |
| WO | WO-2004/096882 A1 | 11/2004 |
| WO | WO-2004/096883 A1 | 11/2004 |
| WO | WO-2004/099227 A2 | 11/2004 |
| WO | WO-2006/012344 A1 | 2/2006 |
| WO | WO-2006/116456 A1 | 11/2006 |

OTHER PUBLICATIONS

"New Considerations in Isocyanate Selection for Automotive Seating Foams" by K.D. Cavender, et al. in 32nd Annual Polyurethane Technical/Marketing Conference, Oct. 1-4, 1989, pp. 594-595.
Low Cost Polyols from Natural Oils, Paper 36, 1995, Colvin et al., UTECH Asia.
Polyurethane Handbook: Chemistry, Raw Materials, Processing, Application, Properties edited by G. Oertel, Hanser Publisher (1993, second edition), section 3.1.1.2.

* cited by examiner

Primary Examiner — John Cooney

(57) ABSTRACT

A high resilience (HR) polyurethane foam comprising the reaction product of (1) at least one polyisocyanate comprising at least about 5 weight percent of at least one methylene diphenyl diisocyanate isomer, derivative or a combination thereof and (2) an admixture of at least one natural oil based polyol and at least one additional polyol which is not a natural oil based polyol, wherein the admixture comprises at least about 10 weight percent natural oil based polyol and at least about 40 weight percent additional polyol having an equivalent weight of at least about 1700 Daltons; and the foam has a resiliency indicated by a ball rebound of at least 40 percent as measured according to the procedures of ASTM D 3574, Test H.

11 Claims, No Drawings

HIGH RESILIENCE FOAMS

BACKGROUND

This invention involves flexible polyurethane foams, preferably such foams based on natural oil polyols and having high resilience.

Foamed articles, especially polyurethane foamed articles are known for many years and used in many applications, especially for automotive seating, cushioning and mattresses. Polyurethane foams are referred to as high resilience (HR) if they have a resilience indicated by ball rebound of greater than about 40 percent measured according to the procedures of ASTM D3574 Test H. High resilience foams are usually foamed using petroleum based polyols having a nominal functionality of an average of about 3 hydroxyl groups per molecule and an average molecular weight range of about 5,000. Such foams are produced at an isocyanate index of from 65 to 115, typically using water levels at most about 5.0 parts by weight per 100 parts by weight per hundred parts polyol (pphp).

It is desirable to use isocyanates based on methylene diphenyl diisocyanate (MDI) because of lower vapor pressure as compared with TDI (Toluene diisocyanate), hence lower potential toxicity; however, it was shown by K. D. Cavender, et al "New Considerations in Isocyanate Selection for Automotive Seating Foams" in $32^{nd}$ Annual Polyurethane Technical/Marketing Conference, Oct. 1-4, 1989, pages 594-595, Technomic Publishing Co, 851 New Holland Avenue, Box 3535, Lancaster, Pa. 17604, USA, that MDI based HR foams have lower ball rebound values than TDI (toluene diisocyanate) based foams (48 percent for MDI foams as compared with 68 percent for TDI foams at equivalent foam hardness).

It would also be desirable to use starting materials produced from renewable resources like biological, especially plant, based materials rather than petroleum based materials. In the case of polyurethanes, it is the polyol that is sometimes based on plant materials. However, using natural oil based polyols to replace conventional polyols in HR foams has been shown to decrease ball rebound values as disclosed by Examples 53 to 56 of WO 2004/096882.

SUMMARY OF THE INVENTION

Surprisingly, it has been found that certain polyols produced from natural oils can be reacted with MDI isocyanates to produce high resilience foams.

It has now been found that a polyurethane foam having a ball rebound of at least about 40 percent as measured by the procedures of ASTM D3574 Test H can be produced as the reaction product of an MDI isocyanate and a polyol composition preferably comprising at least 10 to 60 weight percent of a natural oil based polyol preferably having an OH functionality of at least about 2.2 and an equivalent weight of at least about 500 Dalton (Da) and preferably from 40 to 90 weight percent of at least one conventional polyol having an equivalent weight of at least about 1700 Da.

The invention includes a high resilience (HR) polyurethane foam comprising the reaction product of (1) at least one polyisocyanate comprising at least about 5 weight percent of at least one methylene diphenyl diisocyanate isomer, derivative or a combination thereof and (2) an admixture of at least one natural oil based polyol and at least one additional polyol which is not a natural oil based polyol, wherein the admixture comprises at least about 10 weight percent natural oil based polyol and at least about 40 weight percent additional polyol having an equivalent weight of at least about 1700 Daltons; and the foam has a resiliency indicated by a ball rebound of at least 40 percent as measured according to the procedures of ASTM D 3574, Test H.

The invention also includes a process comprising steps of (a) forming a natural oil based polyol composition comprising at least about 10 weight percent of at least one natural oil based polyol having an OH functionality of at least about 2.2 and an equivalent weight of at least about 500 Dalton (Da) and at least about 40 weight percent of at least one conventional polyol having an equivalent weight of at least about 1700 Da and water; (b) admixing at least one catalyst with the natural oil based polyol composition to form a catalyst polyol admixture; (c) supplying a poly isocyanate comprising at least about 5 weight percent of at least one methylene diphenyl diisocyanate isomer, derivative or combination thereof in an amount corresponding to an isocyanate index of at least about 55 and at most about 105 and (c) admixing the isocyanate with the catalyst polyol admixture.

The invention includes articles made from the foams which are useful in such applications as comfort, sound absorption including noise dampening, harshness dampening, protection, packaging, medical equipment, safety equipment and combinations thereof.

BRIEF DESCRIPTION OF THE DRAWINGS

There are no drawings.

DETAILED DESCRIPTION OF THE INVENTION

Definitions:

The term "resilience" is used to refer to the quality of a foam perceived as springiness. It is measured according to the procedures of ASTM D3574 Test H. This ball rebound test measures the height a dropped steel ball of known weight rebounds from the surface of the foam when dropped under specified conditions and expresses the result as a percentage of the original drop height. As measured according to the ASTM test, an HR foam exhibits a resiliency of at least about 40 percent, more preferably at least about 42 percent, most preferably at least about 48 percent and advantageously up to 50 percent.

The term "ball rebound" is used herein to refer to result of test procedure of ASTM D3574-Test H as previously described.

The term "density" is used herein to refer to weight per unit volume of a foam. In the case of polyurethane foams, the density is determined according to the procedures of ASTM D3574-01, Test A.

The term "core density" is the density measured according to ASTM D3574-95 after removal of any skin that forms on the surface of a molded or free rise foam pad.

The term "air flow" refers to the volume of air which passes through a 1.0 inch (2.54 cm) thick 2 inch×2 inch (5.08 cm) square section of foam at 125 Pa (0.018 psi) of pressure. Units are expressed in cubic decimeters per second and converted to standard cubic feet per minute. A representative commercial unit for measuring air flow is manufactured by TexTest AG of Zurich, Switzerland and identified as TexTest Fx3300. This measurement follows ASTM D 3574 Test G.

The term "75 percent CS" stands for dry compression set test measured at the 75 percent compressive deformation level and parallel to the rise direction in the foam. This test is used herein to correlate in-service loss of cushion thickness and changes in foam thickness. The compression set is determined according to the procedures of ASTM D 3574-95, Test I. and is measured as percentage of original thickness of the sample. Similarly, "50 percent CS" refers to the same measurement (compression set), but this time measured at 50 percent compressive deformation level of the sample, parallel to the rise direction in the foam.

The term "50 percent HACS" stands for humid aged compression set test measured at the 50 percent of compressive deformation and parallel to the rise direction in the foam. This test is used herein to correlate in-service loss and changes in foam thickness. The 50 percent compression set is determined according to the procedures of DIN 53578 and is measured as percentage of original thickness of the sample. Similarly, "75 percent HACS" refers to the same measurement (humid aged compression set), but this time measured at 75 percent compressive deformation level of the sample after humid aging.

The term "Indentation Force Deflection" (IFD) refers to a measure of the load bearing capacity of a flexible material (for instance, foam) measured as the force (in pounds) (converted to kPa) required to compress a four inch (10 cm) thick sample no smaller than 24 inches square (155 cm$^2$), to 25 or 65 percent of the sample's initial height as indicated by the terms 25 percent IFD and 65 percent IFD, respectively. Flexible foam IFD measurements can range from 5 pounds (22 N) (plush) to 80 pounds (356 N) (very firm). The IFD is measured according to the procedures of ASTM 3574-01, Test B.

The term "hardness" refers to that property measured by the procedures of ASTM D 3574, Test B which corresponds to IFD. Specifically 65 percent IFD is used herein as a measure of hardness.

The term "50 percent CFD" refers to a measure of the compression deflection of a flexible material (for instance, foam) measured as the force in kPa required to compress a 5 cm thick sample no smaller than 100 cm square, to 50 percent deflection after 4 precycles. The CFD is measured according to the procedures of DIN 53577.

The term "NCO Index" means isocyanate index, as that term is commonly used in the polyurethane art. As used herein as the equivalents of isocyanate, divided by the total equivalents of isocyanate-reactive hydrogen containing materials, multiplied by 100. Considered in another way, it is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

As used herein, "polyol" refers to an organic molecule having an average of greater than 1.0 hydroxyl groups per molecule. It may also include other functionalities, that is, other types of functional groups.

As used herein the term "conventional polyether polyol" is a polyol formed from at least one alkylene oxide, preferably ethylene oxide, propylene oxide or a combination thereof, and not having a part of the molecule derived from a vegetable or animal oil, a polyol of the type commonly used in making polyurethane foams, particularly for the practice of this invention, HR polyurethane foams. A polyether polyol can be prepared by known methods such as by alkoxylation of suitable starter molecules. Such a method generally involves reacting an initiator such as, water, ethylene glycol, or propylene glycol, glycerol, sorbitol or blends thereof with an alkylene oxide in the presence of a catalyst. Ethylene oxide, propylene oxide, butylene oxide, or a combination of these oxides can be particularly useful for the alkoxylation reaction. A polyether polyol, for instance polyoxyethylene polyol can contain alkyl substituents. The process for producing polyether polyols can involve a heterogeneous feed of a mixture of alkylene oxides, a sequential feed of pure or nearly pure alkylene oxide polyols to produce a polyol with blocks of single components, or a polyol which is capped with, for example, ethylene oxide or propylene oxide. These types of polyols are all known and used in polyurethane chemistry.

The term "natural oil polyol" (hereinafter NOP) is used herein to refer to compounds having hydroxyl groups which compounds are isolated from, derived from or manufactured from natural oils, including animal and vegetable oils, preferably vegetable oils. Examples of vegetable and animal oils that may be used include, but are not limited to, soybean oil, safflower oil, linseed oil, corn oil, sunflower oil, olive oil, canola oil, sesame oil, cottonseed oil, palm oil, rapeseed oil, tung oil, fish oil, or a blend of any of these oils. Alternatively, any partially hydrogenated or epoxidized natural oil or genetically modified natural oil can be used to obtain the desired hydroxyl content. Examples of such oils include, but are not limited to, high oleic safflower oil, high oleic soybean oil, high oleic peanut oil, high oleic sunflower oil (such as NuSun sunflower oil), high oleic canola oil, and high erucic rapeseed oil (such as Crumbe oil). Natural oil polyols are well within the knowledge of those skilled in the art, for instance as disclosed in Colvin et al., UTECH Asia, *Low Cost Polyols from Natural Oils*, Paper 36, 1995 and "Renewable raw materials—an important basis for urethane chemistry:" *Urethane Technology*: vol. 14, No. 2, Apr./May 1997, Crain Communications 1997, WO 01/04225, WO 040/96882; WO 040/96883; U.S. Pat. Nos. 6,686,435, 6,433,121 , 4,508,853, 6,107,403, US Pregrant publications 20060041157, and 20040242910.

The term "natural oil based polyol" is used herein to refer to NOP compounds which are derived from natural oils. For instance, natural oils or isolates therefrom are reacted with compounds ranging from air or oxygen to organic compounds including amines and alcohols. Frequently, unsaturation in the natural oil is converted to hydroxyl groups or to a group which can subsequently be reacted with a compound that has hydroxyl groups such that a polyol is obtained. Such reactions are discussed in the references in the preceding paragraph.

The term "hydroxyl number" indicates the concentration of hydroxyl moieties in a composition of polymers, particularly polyols. A hydroxyl number represents mg KOH/g of polyol. A hydroxyl number is determined by acetylation with pyridine and acetic anhydride in which the result is obtained as the difference between two titrations with KOH solution. A hydroxyl number may thus be defined as the weight of KOH in milligrams that will neutralize the acetic anhydride capable of combining by acetylation with 1 gram of a polyol. A higher hydroxyl number indicates a higher concentration of hydroxyl moieties within a composition. A description of how to determine the hydroxyl number for a composition can be found in texts well-known in the art, for example in Woods, G., *The ICI Polyurethanes Book*—2nd ed. (ICI Polyurethanes, Netherlands, 1990).

The term "primary hydroxyl group" means a hydroxyl group (—OH) on a carbon atom which has only one other carbon atom attached to it, (preferably which has only hydrogen atoms attached thereto) (—CH$_2$—OH).

The term "cure" or "cured" as applied to a foam refers to the condition in which all isocyanate functional groups have been converted to other chemical species via chemical reactions.

The term "functionality" particularly "polyol functionality" is used herein to refer to the number of hydroxyl groups in a polyol.

All percentages, preferred amounts or measurements, ranges and endpoints thereof herein are inclusive, that is, "less than about 10" includes about 10. "At least" is, thus, equivalent to "greater than or equal to," and "at most" is, thus, equivalent "to less than or equal to." Numbers herein have no more precision than stated. Thus, "115" includes at least from 114.5 to 115.49. Furthermore, all lists are inclusive of combinations of two or more members of the list. All ranges from a parameters described as "at least," "greater than," "greater than or equal to" or similarly, to a parameter described as "at most," "up to," "less than," "less than or equal to" or similarly are preferred ranges regardless of the relative degree of preference indicated for each parameter. Thus a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Except in the examples, or where otherwise indicated, all numbers expressing quantities, percentages, OH numbers, functionalities and so forth in the specification are to be understood as being modified in all instances by the term "about." Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

This invention comprises high resilience (HR) foam, that is a foam having a ball rebound of at least about 40 percent as measured by the procedures of ASTM D3574 Test H, which is the reaction product of an MDI isocyanate and a polyol composition comprising at least 10 to 60 weight percent of a natural oil based polyol having an OH functionality of at least about 2.2 and an equivalent weight of at least about 500 Dalton (Da) and from 40 to 90 weight percent of at least one conventional polyol having an equivalent weight of at least about 1700 Da. The natural oil based polyol is suitably any such compound that those skilled in the art can use according to the practice of the invention to produce a HR foam. The natural oil based polyol advantageously has at least about 2.2, preferably at least about 2.4, more preferably at least about 2.6, most preferably at least about 2.8, and preferably at most about 5, more preferably at most about 4, most preferably at most about 3 hydroxyl groups per molecule. The natural oil based polyol advantageously has an equivalent weight at least sufficient to form foam that exhibits a high resiliency, that is advantageously at least about 500, preferably at least about 750, more preferably at least about 1000, most preferably at least about 1200 and preferably at most about 2500, more preferably at most about 2,000, most preferably at most about 1800 Daltons. The natural oil based polyols having these preferred hydroxyl functionalities, equivalent weights or a combination thereof are suitably blended with conventional polyether polyols in the practice of the invention.

Among natural oil based polyols, polyols disclosed in WO 04/096882 and WO 04/096883 are most preferred. These are the reaction products of initiators having active hydrogen such as a polyol or polyamine, amino alcohol or mixture thereof with a vegetable oil based monomer prepared by such processes as hydroformylation of unsaturated fatty acids or esters, followed by hydrogenation of at least a portion of the resulting formyl groups. Such a polyol is referred to hereinafter as "initiated fatty acid polyester alcohol."

In making a initiated fatty acid polyester alcohol preferred in the practice of the invention, a hydroxymethyl-containing polyester polyol is conveniently prepared by reacting a hydroxymethyl-group containing fatty acid having from 12-26 carbon atoms, or an ester of such a hydroxymethylated fatty acid, with a polyol, hydroxylamine or polyamine initiator compound having an average of at least 2 hydroxyl, primary amine and/or secondary amine groups/molecule. Proportions of starting materials and reaction conditions are selected such that the resulting hydroxymethyl-containing polyester polyol contains an average of at least 1.3 repeating units derived from the hydroxymethyl-group containing fatty acid or ester thereof for each hydroxyl, primary amine and secondary amine groups in the initiator compound, and the hydroxymethyl-containing polyester polyol has an equivalent weight of at least 400 up to 15,000. The hydroxymethyl-containing polyester polyol advantageously is a mixture of compounds having the following average structure (Structure 1):

$$[H-X]_{(n-p)}-R-[X-Z]_p \qquad (I)$$

wherein R is the residue of an initiator compound having n hydroxyl and/or primary or secondary amine groups, where n is at least two; each X is independently —O—, —NH— or —NR'— in which R' is an inertly substituted alkyl, aryl, cycloalkyl, or aralkyl group, p is a number from 1 to n representing the average number of [X—Z] groups per hydroxymethyl-containing polyester polyol molecule, Z is a linear or branched chain comprising residues of fatty acids. "Inertly substituted" groups are groups that do not react with an isocyanate groups and which do not otherwise engage in side reactions during the preparation of the hydroxymethyl-group containing polyester polyol. Examples of such inert substituents include as aryl, cycloalkyl, silyl, halogen (especially fluorine, chlorine or bromine), nitro, ether, ester.

In formula I, n is preferably from 2-8, more preferably from 2-6, even more preferably from 2-5 and especially from 3-5. Each X is preferably —O—. The total average number of fatty acid residues per hydroxymethylated polyol molecule is preferably at least 1.5 times the value of n, such from 1.5 to 10 times the value of n, 2 to 10 times the value of n or from 2 to 5 times the value of n.

Hydroxymethyl-containing polyester polyols according to structure I can be prepared in a multi-step process from vegetable or animal fats that contain one or more carbon-carbon double bonds in at least one constituent fatty acid chain. Suitable fats include, for example, chicken fat, canola oil, citrus seed oil, cocoa butter, corn oil, cottonseed oil, lard, linseed oil, oat oil, olive oil, palm oil, peanut oil, rapeseed oil, rice bran oil, safflower oil, sesame oil, soybean oil, sunflower oil, or beef tallow.

The vegetable or animal fat is conveniently first subjected to a transesterification reaction with a lower alkanol, especially methanol or ethanol, to produce alkyl esters of the constituent fatty acids. The resulting alkyl esters may be hydrolyzed to the corresponding fatty acids if desired, but this step is usually not necessary or desirable. The alkyl esters (or fatty acids) are conveniently hydroformylated by reaction with carbon monoxide and hydrogen. This introduces —CHO groups onto the fatty acid chain at the site of carbon-carbon unsaturation. Suitable hydroformylation methods are described in U.S. Pat. Nos. 4,731,486 and 4,633,021, for example, and in U.S. Provisional Patent Application 60/465,663, filed Apr. 25, 2003, all incorporated herein by reference. Some fatty acid groups contain multiple carbon-carbon double bond sites. In such cases, the hydroformylation reaction may not introduce —CHO groups at all of the double bond sites. A subsequent hydrogenation step converts the —CHO groups to hydroxymethyl (—CH$_2$OH) groups while hydrogenating residual carbon-carbon bonds to remove essentially all carbon-carbon unsaturation. The resulting mixture of hydromethylated fatty acids is then reacted with an initiator compound, with removal of water or lower alkanol to form the polyester polyol.

The initiator contains two or more hydroxyl, primary amine or secondary amine groups, and can be a polyol, an alkanol amine or a polyamine. Initiators of particular interest are polyols. Polyether polyol initiators are useful, including polymers of ethylene oxide and/or propylene oxide having from 2-8, especially 2-4 hydroxyl groups/molecule and a molecular weight of about 150-3000, especially from 200-1000. For the practice of the present invention, preferred initiators include glycerine which has been alkoxylated, preferably ethoxylated, propoxylated or a combination thereof. Such alkoxylated glycerines have a nominal functionality of 3 and an equivalent weight of preferably at least about 200, more preferably at least about 300, most preferably at least about 400 and preferably at most about 1500, more preferably at most about 2000, most preferably at most about 1700. Preferably the polyols have a level of unsaturation below about 0.09 meq/g. Formation of such polyols from the alkene oxides is optionally KOH or Double Metal Cyanide (DMC) catalyzed. In case of KOH they are subsequently finished to remove K. For these compounds n in Structure 1 is 3.

Hydroxymethyl-containing fatty acids made in the foregoing process tend to be a mixture of materials having no hydroxymethyl groups, and materials having 1, 2 or 3 hydroxymethyl groups. The proportion of materials having 2 and 3 hydroxymethyl groups is typically somewhat lower than the proportion of starting fatty acids (or alkyl esters) containing 2 and 3 carbon-carbon double bonds, as the hydroformylation reaction often does not take place across all the carbon-carbon double bonds unless stringent reaction conditions are used. Carbon-carbon double bonds that are not hydroformylated generally become hydrogenated.

Methods of making such hydroxymethyl-containing polyester polyols are described in WO2004/096882.

The hydroxymethyl-containing polyester polyol so produced generally contains some unreacted initiator compound, and may contain unreacted hydromethylated fatty acids (or esters). Initiator compounds often react only monofunctionally or difunctionally with the fatty acids (or esters), and resulting polyester polyol often contains free hydroxyl or amino groups bonded directly to the residue of the initiator compound.

The natural oil based polyol is advantageously used in an amount of at least about 10 percent by weight, preferably at least about 15, more preferably at least about 20, and preferably at most about 60, more preferably at most about 30, most preferably at most about 20 percent by weight.

The natural oil based polyol is used with polyols different from natural oil based polyol, such as polyether polyols commonly used in forming polyurethane foams, especially HR foams, referred to hereinafter as conventional polyol or additional polyol. The conventional polyol advantageously has an equivalent weight at least sufficient to form foam that exhibits a high resiliency, that is advantageously at least about 1700, preferably at least about 1,800, more preferably at least about 1,900, and preferably at most about 2,500, more preferably at most about 2,100, most preferably at most about 2,000 Daltons. To make a HR foam, the conventional polyol advantageously has at least about 2, preferably at least about 2.2, more preferably at least about 2.5, most preferably at least about 2.8, and preferably at most about 3.4, more preferably at most about 3.0, most preferably at most about 2.9 hydroxyl groups per molecule. The additional polyol preferably has an unsaturation level below about 0.09 meq/g. The polyol may be a polymer of one or more alkylene oxides such as ethylene oxide, propylene oxide and 1,2-butylene oxide, or mixtures of such alkylene oxides. Preferred polyethers are polypropylene oxides or polymers of a mixture of propylene oxide and ethylene oxide. Polymerization of the alkoxides is optionally catalyzed using Double Metal Cyanide (DMC) catalysts or using potassium hydroxide (KOH). The additional polyol may also be a polyester polyol. These polyester polyols include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol. Polycaprolactone polyols such as those sold by The Dow Chemical Company under the trade name "Tone" are also useful. While any conventional polyol is suitably used, preferred polyols are those which are aliphatic polyols, more preferably polyester, most preferably polyethers. Additionally a polyol containing a high ethylene oxide level, that is a level above about 50 percent, is used as a cell opener at concentrations of below about 10 parts, more preferably below about 5 percent by weight of the polyol blend.

The conventional polyol s advantageously used in an amount of at least about 40 percent by weight, preferably at least about 45, more preferably at least about 50, and preferably at most about 90, more preferably at most about 80, most preferably at most about 60 percent by weight. For the purposes of this invention the polyol or polyol combination used to make an HR foam of the invention is referred to as natural oil based polyol composition.

The natural oil based polyol composition is reacted with at least one methylene diphenyl diisocyanate having an average of 1.8 or more isocyanate groups per molecule. The isocyanate functionality is preferably at least about 2.0, more preferably at least about 2.1, most preferably at least about 2.2, and preferably at most about 2.7, more preferably at most about 2.5, most preferably at most about 2.3. Exemplary methylene diphenyl diisocyanates include, for example, the various isomers of diphenylmethanediisocyanate (MDI), derivatives of MDI such as biuret-modified "liquid" MDI products and polymeric MDI, (PMDI). Preferably the MDI is a prepolymer within the skill in the art such as disclosed, for instance in EP 485,953; optionally the MDI is Puromeric, that is a blend of polymeric MDI and monomeric MDI. Optionally, the MDI is combined with other isocyanates such as TDI (toluene diisocyanate) or aliphatic isocyanates such as CHDI (1,4-cyclihexane diisocyanate) or IPDI (isophorone diisocyanate). In the practice of the invention the resulting isocyanate blend contains at least about 5 percent by weight MDI or MDI derivative such as PMDI, preferably at least about 10, more preferably at least about 25, most preferably at least about 50 weight percent MDI or derivative thereof.

Water is used in addition to the natural oil based polyol composition and isocyanate in a composition used to make a foam of the invention. The water is used to achieve blowing of the foam and to form urea segments (hard segments) by reaction with the isocyanate. While slab stock polyurethane foams typically use an amount of water from 2.5 to 6 parts by weight per hundred parts by weight of total polyol (pphp), HR foams of the invention advantageously use at least about 2.0, preferably at least about 2.5, more preferably at least about 3.0, most preferably at least about 3.5 pphp, calculated as parts by weight compared to 100 parts of the total weight of polyol components, and advantageously at most about 10, preferably at most about 8, more preferably at most about 6, most preferably at most about 5 pphp based on total weight of polyol components. In some instances the blowing reactions or density control is achieved by combining water with other blowing agents, for examples hydrocarbons (for instance, cyclo, iso, or n-pentanes) or hydrofluorocarbons (HFCs) and other volatilizable molecules (gaseous or liquids) such as carbon dioxide. Partial vacuum (reduced atmospheric pressure, for instance down to 0.5 Bar) is optionally employed in the practice of the present invention The amount of isocyanate in proportion to the total polyol and water is indicated by the isocyanate index. In the HR foams of the invention, MDI is used as the isocyanate, the isocyanate index is preferably at least about 55, more preferably at least about 65, most preferably at least about 95, and preferably at most about 125, more preferably at most about 115, most preferably at most about 105.

At least one natural oil based polyol composition and at least one isocyanate are reacted together in the presence of one or more catalysts. The formation of urethane foams commonly utilizes at least one catalyst that may catalyze the polyol-isocyanate (gelling) reaction or at least one that may catalyze the water-isocyanate (blowing) reaction (when water is used as the blowing agent), or both. In making water-blown foams, it is typical to use a mixture of at least one catalyst that favors the blowing reaction and at least one other that favors the gelling reaction or one catalyst that does both. These are balanced to achieve sufficient gelling (viscosity) to maintain a desirable cellular structure while achieving sufficient blowing to foam the formulation and, preferably, open many of the cells in the foam. In making HR foams, a tin catalyst such as dibutyltin dilaurate, (DBTDL) is typically used. Surprisingly, in the practice of the present invention, while DBTDL is useful, stannous octoate (SO) is also a preferred tin catalyst, in some embodiments more preferred. It is also common to produce HR foams using a combination of amine polyols, which combination is useful in the practice of this invention; however, in the practice of this invention use of a single amine catalyst that promotes the blowing reaction is preferred to reduce odor of the final foam product and to simplify the formulations to make the foam products.

A wide variety of materials are known to catalyze polyurethane forming reactions, including tertiary amines; tertiary phosphines such as trialkylphosphines and dialkylbenzylphosphines; various metal chelates such as those which can be obtained from acetylacetone, benzoylacetone, trifluoroacetyl acetone, ethyl acetoacetate, with metals such as Be, Mg, Zn, Cd, Pd, Ti, Zr, Sn, As, Bi, Cr, Mo, Mn, Fe, Co and Ni; acid metal salts of strong acids, such as ferric chloride, stannic chloride, stannous chloride, antimony trichloride, bismuth nitrate and bismuth chloride; strong bases such as alkali and alkaline earth metal hydroxides, alkoxides and phenoxides, various metal alcoholates and phenolates such as $Ti(OR)_4$, $Sn(OR)_4$ and $Al(OR)_3$, wherein R is alkyl or aryl, and the reaction products of the alcoholates with carboxylic acids, beta-diketones and 2-(N,N-dialkylamino)alcohols; alkaline earth metal, Bi, Pb, Sn or Al carboxylate salts; and tetravalent tin compounds, and tri- or pentavalent bismuth, antimony or arsenic compounds. Preferred catalysts include tertiary amine catalysts and organotin catalysts. Examples of commercially available tertiary amine catalysts include: trimethylamine, triethylamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used. Examples of commercially available amine catalysts include Niax™ A1 and Niax™ A99 (bis(dimethylaminoethyl)ether in propylene glycol available from GE Advanced Materials, Silicones), Niax™ B9 (N,N-dimethylpiperazine and N—N-dimethylhexadecylamine in a polyalkylene oxide polyol, available from GE Advanced Materials, Silicones), Dabco™ 8264 (a mixture of bis(dimethylaminoethyl)ether, triethylenediamine and dimethylhydroxyethyl amine in dipropylene glycol, available from Air Products and Chemicals), and Dabco™ 33LV (triethylene diamine in dipropylene glycol, available from Air Products and Chemicals), Niax™ A-400 (a proprietary tertiary amine/carboxylic salt and bis(2-dimethylaminoethy)ether in water and a proprietary hydroxyl compound, available from GE Advanced Materials, Silicones); Niax™ A-300 (a proprietary tertiary amine/carboxylic salt and triethylenediamine in water, available from GE Advanced Materials, Silicones); Polycat™ 58 (a proprietary amine catalyst available from Air Products and Chemicals), Polycat™ 5 (pentamethyl diethylene triamine, available from Air Products and Chemicals) and Polycat™ 8 (N,N-dimethyl cyclohexylamine, available from Air Products and Chemicals).

Examples of organotin catalysts are stannic chloride, stannous chloride, stannous octoate, stannous oleate, dimethyltin dilaurate, dibutyltin dilaurate, other organotin compounds of the formula $SnRn(OR)_{4-n}$, wherein R is alkyl or aryl and n is 0-2. Organotin catalysts are generally used in conjunction with one or more tertiary amine catalysts, if used at all. Commercially available organotin catalysts of interest include Dabco™ T-9 and T-95 catalysts (both stannous octoate compositions available from Air Products and Chemicals).

Catalysts are typically used in small amounts, for example, each catalyst being employed from 0.0015 to 5 percent by weight of the natural oil based polyol composition. The amount depends on the catalyst or mixture of catalysts, the desired balance of the gelling and blowing reactions for specific equipment, the reactivity of the polyols and isocyanate as well as other factors familiar to those skilled in the art.

In order to reduce VOC (Volatile Organic Compounds) emissions, isocyanate reactive catalytic amines, such as those described in EP 747,407 are optionally used, preferably amine initiated polyols such as those disclosed in EP 539,819; U.S. Pat. No. 5,672,636 or WO 01/58976 are used with the present invention.

A surfactant is often advantageously included in the HR foam formulation to help stabilize the foam as it expands and cures. Examples of surfactants include nonionic surfactants and wetting agents, such as those prepared by the sequential addition of propylene oxide and then ethylene oxide to propylene glycol, solid or liquid organosilicones and polyethylene glycol ethers of long chain alcohols. Ionic surfactants such as tertiary amine or alkylolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones, which are most preferred. Examples of useful organosilicone surfactants include commercially available polysiloxane/polyether copolymers such as Tegostab (trademark of Goldschmidt Chemical Corp.) B-8462 and B-8404, and DC-198 and DC-5043 surfactants, available from Dow Corning, and Niax™ 627 surfactant from GE Advanced Materials, Silicones. While the amount of surfactant varies with the surface activity of the particular surfactant and its ability to stabilize or open the foam cell structure, and the reactivity, surface tension and viscosity of the mixture of polyols, it is commonly used in amounts between 0.0015 and 3 pphp based on total weight of polyols.

The foamable composition may contain a chain extender or crosslinker, but their use is generally not preferred, and these materials are typically used in small quantities (such as up to 10 parts, especially up to 2 parts, by weight per 100 parts by weight polyol or polyol mixture) when present at all. A chain extender is a material having exactly two isocyanate-reactive groups/molecule, whereas a crosslinker contains on average greater than two isocyanate-reactive groups/molecule. In either case, the equivalent weight per isocyanate-reactive group can range from 30 to 125, but is preferably from 30 to 75. The isocyanate-reactive groups are preferably aliphatic alcohol, primary amine or secondary amine groups, with aliphatic alcohol groups being particularly preferred. Examples of chain extenders and crosslinkers include alkylene glycols such as ethylene glycol, 1,2- or 1,3-propylene glycol, 1,4-butanediol, 1,6-hexanediol; glycol ethers such as diethylene glycol, triethylene glycol, dipropylene glycol, tripropylene glycol; cyclohexane dimethanol; glycerine; trimethylolpropane; triethanolamine; diethanol amine.

Although it is preferred that no additional blowing agent (other than the water) be included in the foamable polyurethane composition, that is less than an intentional amount or preferably less than about 0.5 pphp, it is within the scope of the invention to include an additional physical or chemical blowing agent. Among the physical blowing agents are $CO_2$ and various hydrocarbons, fluorocarbons, hydrofluorocarbons, chlorocarbons (such as methylene chloride), chlorofluorocarbons and hydrochlorofluorocarbons, ketones such as methyl; ethyl ketone or acetone, and esters such as methyl formate. Chemical blowing agents are materials that decompose or react (other than with isocyanate groups) at elevated temperatures to produce carbon dioxide and/or nitrogen.

Compositions used to produce the HR foams of the invention optionally include any of the additives commonly known in the art for the production of polyurethane polymers. Any of a range of additives such as surfactants, cell openers, colorants, fillers, load bearing enhancement additives such as SAN (Styrene and Acrylonitrile), PHD (polyurea) or PIPA (polyisocyanate polyalkanolamine) copolymer polyols, internal mold releases, antistatic agents, antimicrobial agents, additives for reducing combustibility, dispersants, fillers, including recycled PU foam powder, and other additives known to those skilled in the art are useful within the scope of the invention.

In forming the polyurethane from natural oil based polyol compositions, the natural oil based polyol composition can be blended with appropriate additives such as foaming agent, drying agent, filler, pigment, catalyst, to produce the formulated polyol. An amount of isocyanate corresponding to the isocyanate indexes previously discussed is added and stirred with the polyol. The polyol/isocyanate mixture is maintained under dry air or nitrogen or vacuum until foaming stops and then poured into mold. A resulting polyurethane foam can be cured either at room temperature or at higher temperature.

In one embodiment the process for forming a HR foam includes steps of (a) forming a natural oil based polyol composition comprising at least about 10 weight percent of at least one natural oil based polyol having an OH functionality of at least about 2.2 and an equivalent weight of at least about 500 Dalton (Da) and at least about 40 weight percent of at least one conventional polyol having an equivalent weight of at least about 1700 Da and water; (b) admixing at least one catalyst with the natural oil based polyol composition to form a catalyst polyol admixture; (c) supplying a poly isocyanate comprising at least about 5 weight percent of at least one methylene diphenyl diisocyanate isomer, derivative or combination thereof in an amount corresponding to an isocyanate index of at least about 55 and at most about 105 and (c) admixing the isocyanate with the catalyst polyol admixture. These steps optionally occur simultaneously or in any order. Optionally, additional components such as auxiliary blowing agents are also added. It should be noted that while the process as described includes admixing at least one natural oil based polyol with other polyols to form the natural oil based polyol composition, it also includes adding at least one natural oil based polyol as an additive to the natural oil based polyol composition.

The HR foam can be prepared in a so-called slabstock process, or by various molding processes. Slabstock processes are of most interest. In a slabstock process, the components are mixed and poured into a trough or other region where the formulation reacts, expands freely in at least one direction, and cures. Slabstock processes are generally operated continuously at commercial scales, but may also be operated in a discontinuous or box foam process.

In a slabstock process, the various components are introduced individually, or in various subcombinations, into a mixing head, where they are mixed and dispensed. Component temperatures are generally in the range of from 15 to 35° C. prior to mixing. The dispensed mixture typically expands and cures without applied heat. In the slabstock process, the reacting mixture expands freely or under minimal restraint (such as may be applied due to the weight of a cover sheet or film). Alternately the components for making HR foam can be combined simultaneously as in equipment designed for the continuous production of slabstock foam, such as a Maxfoam machine or other methods within the skill in the art such as are described by Hebner, in "Polyurethane Foam: Polymers' Cinderella Product" presented at Insight 95 International Conference, October 1995 available from Foamex International. Such processes can be run using either high pressure injection head technology, optionally utilizing injection of auxiliary blowing agents such as $CO_2$, or also in a low pressure injection system with in-line component mixing. Both technologies are known to those skilled in the art. It is also possible to produce the HR foam in a molding process, by introducing the reaction mixture into a closed mold, where it expands and cures. See *Polyurethane Handbook, Chemistry, Raw Materials, Processing, Application, Properties* edited by G. Oertel, Hanser publisher (1993, second edition) for a full description of these industrial applications. Other processes can also be used, such as spray foam techniques, where the foaming mixture is sprayed into place against a substrate either by the use of manual spray equipment, or by robotic foam spray equipment, such as the type used to spray sound dampening foam into automobile interiors. In addition, processes such as variable pressure foaming (VPF), in which the foam is produced under decreased pressure in order to make foam with lower hardness at lower density than can be obtained with the same formulation at atmospheric pressure, may be used. Alternatively the VPF process may be performed under increased pressure in order to obtain higher density foam with higher hardness than can be obtained with the same formulation at atmospheric pressure.

The HR foams of the invention advantageously have at least one of (a) a density below about 80 $kg/m^3$, (b) a resiliency above about 40 percent, (c) a dry 75 percent compression set is below about 30 percent, or preferably a combination thereof. Density of a foam of the invention determined according to the procedures of ASTM D3574-01, Test A is advantageously at least about 25, preferably at least about 30 more preferably at least about 35 and preferably at most about 80, more preferably at most about 55, most preferably at most about 50 $kg/m^3$. As measured according to ASTM D 3574, Test H, the foam of the invention foam exhibits a resiliency of at least about 40 percent, more preferably at least about 42 percent, most preferably at least about 48 percent and advantageously up to 50 percent. Foams of the invention have a dry 75 percent compression set of advantageously at most about 30, more advantageously at most about 25, preferably at most about 20, more preferably at most about 15, most preferably at most about 10 percent as measured by the procedures of ASTM D 3574-95, Test I.

HR foams of the invention are useful for any of the uses of existing HR foams, for instance, comfort applications such as mattresses, pillows and cushioning for seating, for sound absorption, for vibration dampening and combinations thereof. Additionally, the foams of the invention are useful in a variety of packaging and cushioning applications, such as mattresses, packaging, bumper pads, sport and medical equipment, helmet liners, pilot seats, earplugs, and various noise and vibration dampening applications.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

EXAMPLES

The following materials are used in making foams of the invention:

PEPO-1 is a 3 functional, 1630 equivalent weight polyether polyol commercially available from The Dow Chemical Company under the trade designation Voranol CP 4711 polyol;

PEPO-2 is a 3 functional, 2000 equivalent weight polyether polyol commercially available from The Dow Chemical Company under the trade designation Voranol CP 6001 polyol;

PEPO-3 is a 2 functional, 1900 equivalent weight polyether polyol commercially available from The Dow Chemical Company under the trade designation Voranol EP 1900 polyol PEPO-4 is a 4.7 functional, 1,750 equivalent weight polyether polyol with 15 percent ethylene oxide (EO) capping, available from The Dow Chemical company under the trade designation Specflex NC 632

PEPO-5 is a SAN (Styrene Acrylonitrile) based copolymer polyol commercially available from The Dow Chemical Company under the trade designation Specflex NC 700

PEPO-6 is a 4 functional, 1,700 equivalent weight polyether polyol with 17.5 percent EO capping, initiated with 3,3'-diamino-N-methyl-dipropylamine NOPO-1 is a 3-functional natural oil polyol prepared using fatty acids from soy oil and has a primary hydroxyl content of 100 percent with a hydroxyl number (OH#) of 89. It is made by reacting hydroxymethylated soybean fatty acid methyl esters with a 625 molecular weight poly(ethylene oxide) triol (INITIATOR-1) made by ethoxylation at 120° C. of glycerol until an equivalent weight of 209 is reached using 0.3 percent final level of KOH and finishing with synthetic magnesium silicate as known in the skill in the art and taught in such references as *Polyurethane Handbook, Chemistry, Raw Materials, Processing, Application, Properties* edited by G. Oertel, Hanser publisher (1993, second edition) section 3.1.1.2, at a 4:1 molar ratio, using 500 ppm of stannous octoate as the catalyst. The resulting polyether-polyester has a viscosity of 2,700 mPa·s at 21° C., a hydroxyl equivalent weight of 640, Mn of 2500, Mw of 3550, and a polydispersity of 1.44. NOPO-1 has an average of approximately 3.0 hydroxyl groups/molecule.

NOPO-1 corresponds to Structure I, wherein X is —O—, and n=3.

NOPO-2 is a 3-functional natural oil polyol prepared using fatty acids from soy oil and has a primary hydroxyl content of 100 percent with a hydroxyl number (OH#) of 55. It is made by reacting hydroxymethylated soybean fatty acid methyl esters with a 450 equivalent weight poly(ethylene oxide) triol, under same conditions used in making INITIATOR-1 but at a 5.5:1 molar ratio, using 990 ppm stannous octoate as the catalyst. The resulting polyether-polyester has a viscosity of 5,200 m Pa·s at 21° C., a hydroxyl equivalent weight of 2609, Mw of 4262, and a polydispersity of 1.63. NOPO-2 has an average of approximately 3 hydroxyl groups/molecule.

NOPO-3 is a 3-functional natural oil polyol prepared using fatty acids from soy oil and has a primary hydroxyl content of 100 percent with a hydroxyl number (OH#) of 45. It is made by reacting hydroxymethylated soybean fatty acid methyl esters with a 550 equivalent weight poly(ethylene oxide/propylene oxide) triol made by propoxylation of glycerol until a molecular weight of 450 is reached, then ethoxylation with 27 moles of EO, under the same conditions used in making INITIATOR-1, except at a 6.9:1 molar ratio, using 578 ppm stannous octoate as the catalyst. The resulting polyether-polyester has a viscosity of 5,400 mPa·s at 21° C., a hydroxyl equivalent weight of 3350, Mw of 5413, and a polydispersity of 1.61. NOPO-3 has an average of approximately 3 hydroxyl groups/molecule.

NOPO-4 is a 3-functional natural oil polyol prepared using fatty acids from soy oil and has a primary hydroxyl content of 100 percent with a hydroxyl number (OH#) of 35. It is made by reacting hydroxymethylated soybean fatty acid methyl esters with a, poly(propylene oxide/ethylene oxide) triol having an equivalent weight of 550, made by propoxylation of glycerol until a molecular weight of 450 is reached, then reaction of 27 moles of EO, under the same conditions used in making INITIATOR-1 except at a 9.9:1 molar ratio, using 717 ppm Stannous Octoate as the catalyst. The resulting polyether-polyester has a viscosity of 7,700 mPa·s at 21° C., a hydroxyl equivalent weight of 3775, Mw of 6365, and a polydispersity of 1.68. NOPO-4 has an average of approximately 3 hydroxyl groups/molecule.

NOPO-5 is a 3-functional natural oil polyol prepared using fatty acids from soy oil and has a primary hydroxyl content of 100 percent with a hydroxyl number (OH#) of 32. It is made by reacting hydroxymethylated soybean fatty acid methyl esters with a poly(alkylene oxide) triol, having 6 mer units of propylene oxide and 27 mer units of ethylene oxide and an equivalent weight of 660, made by propoxylation of glycerol until a molecular weight of 450, then addition of 6 moles of PO, followed by reaction of 27 moles of EO, giving an equivalent weight of about 660, made under the conditions used in making INITIATOR-1 except at a 11.8:1 molar ratio, using 578 ppm Stannous Octoate as the catalyst. The resulting polyester has a viscosity of 7,900 mPa·s at 21° C., a hydroxyl equivalent weight of 3770, Mw of 6213, and a polydispersity of 1.65.

NOPO-5 has an average of approximately 3 hydroxyl groups/molecule.

Water is deionized water.

NCO-1 is an MDI prepolymer having a weight percent NCO of 29.5 commercially available from The Dow Chemical Company under the trade designation SPECFLEX NE 134 isocyanate.

NCO-2 is a polymeric MDI having a weight percent NCO of 31.5 commercially available from Bayer AG under the trade designation DESMODUR 3230 isocyanate.

NCO-3 is a blend of 80 percent by weight TDI 80/20 and 20 percent by weight PMDI (polymeric MDI) available from The Dow Chemical Company under the trade designation Specflex TM-20 isocyanate MOD-1 is a silicone based surfactant commercially available from Degussa-Goldschmidt Chemical Corp. under the trade designation Tegostab B-8715LF.

MOD-2 is an ethoxylated/propoxylated triol polyether polyol acting as a cell opener commercially available from The Dow Chemical Company under the trade designation VORANOL™ CP 1421.

MOD-3 is a cell opener commercially available from Degussa-Goldschmidt Chemical Corp. under the trade designation Tegostab B-8948.

CAT-1 is a crosslinker, based on 99+pure Diethanolamine (DEOA) commercially available from Sigma-Aldrich Co.;

CAT-2 is a 33 percent solution of diethylenetriamine in 67 percent dipropylene glycol commercially available from Air Products and Chemicals, Inc. under the trade designation Dabco™ 33LV catalyst;

CAT-3 is bis(dimethylaminoethyl)ether catalyst commercially available from GE Advanced Materials, Silicones under the trade designation Niax™ A1 catalyst.

CAT-2 is an amine catalyst commercially available from GE Advanced Materials, Silicones under the trade designation Niax™ A300.

CAT-4 is N,N. dimethylethanolamine (DMEA) commercially available from Sigma-Aldrich Co.

In each example and comparative sample prepared according to "Process A" a foam is prepared by individually weighing all of the components and additives (indicated as MOD-1, MOD-2, and MOD-3) of a given formulation including the catalysts, and weighing them into a one liter capacity cup. Component temperatures are approximately 23° C. The components are premixed for 30 seconds at 2,000 rpm using an electric driven stirrer. The isocyanates indicated in the tables are then added to the stirred components and mixed for an additional 5 seconds at 2,000 rpm. The reactants are then poured into a 30×30×10 cm aluminum mold heated at 60° C. that has been sprayed with release agent commercially available from Klueber Lubrication under the trade designation Klueber 3028 release agent. The time when foaming mass reaches the vent holes is referred to in the tables as the mold exit time; whereas the demolding time is maintained at least 4 minutes or longer if foam cannot be properly demolded without deformation. Foam pads are crushed manually at demold to open cells and avoid possibility of shrinkage. Any other distinct reaction characteristics, such as foam odor, skin aspect are observed and recorded if they are not satisfactory. The resulting foam pads are then allowed to cure overnight under a ventilated fume hood. They are then placed in ambient storage for a period of seven days before being submitted for physical property assessment using ASTM and DIN test methods designated in the definitions of the properties given previously.

Examples 1-3 and Comparative Samples A-C

Process A is used to prepare the foams described in Table 1:

TABLE 1

EXAMPLES 1-3 and Comparative Samples A-C

| | Example (EX) or Comparative Sample (CS) | | | | | |
|---|---|---|---|---|---|---|
| | CS A | CS B | CS C | EX 1 | EX 2 | EX 3 |
| PEOP-2 pphp | | | 100 | 70 | 70 | 60 |
| PEOP-1 pphp | 100 | 70 | | | | |
| NOPO-1 pphp | | 30 | | 30 | 30 | 40 |
| Water pphp | 3.5 | 3.5 | 3.5 | 3.5 | 3.5 | 3.5 |
| CAT-1 pphp | 0.5 | 0.5 | 0.5 | 0.5 | 0.5 | 0.5 |
| CAT-2 pphp | 0.4 | 0.4 | 0.4 | 0.4 | 0.4 | 0.4 |
| CAT-3 pphp | 0.05 | 0.05 | 0.05 | 0.05 | 0.05 | 0.05 |
| MOD-1 pphp | 1.0 | 1.5 | 1.5 | 1.5 | 1.5 | 1.5 |
| MOD-2 pphp | 2.0 | 2.0 | 2.0 | 2.0 | 2.0 | 2.0 |
| NCO-1 index | 90 | 90 | 90 | 90 | | |
| NCO-2 index | | | | | 80 | 80 |
| Mold exit time (s) | 72 | 66 | 71 | 63 | 65 | 57 |
| Demolding time (mi) | 5 | 5 | 5 | 5 | 4 | 4 |

TABLE 1-continued

EXAMPLES 1-3 and Comparative Samples A-C

| | Example (EX) or Comparative Sample (CS) | | | | | |
|---|---|---|---|---|---|---|
| | CS A | CS B | CS C | EX 1 | EX 2 | EX 3 |
| Part weight (g) | 432 | 427 | 427 | 427 | 431 | 429 |
| Comments | open | tight | Open | Tight | tight | tight |
| Core density kg/m³ | 46.3 | 45.8 | 48.7 | 46.1 | 45 | 44.2 |
| 50% CFD (KPa) | 5.4 | 6.0 | 5.2 | 5.6 | 4.9 | 5.0 |
| Airflow (cfm) | 1.1 | 1.7 | 2.0 | 2.3 | 2.3 | 2.5 |
| Resiliency (%) | 55 | 41 | 52 | 44 | 44 | 40 |
| 50% CS (% CD) | 10.1 | 9.2 | 10.9 | 10.4 | 23.9 | 21.4 |
| 75% CS (% CD) | 7.7 | 10.0 | 9.1 | 8.7 | 30.4 | 20.8 |
| 50% HACS (% CT) | 21 | 11.5 | 9.6 | 10.6 | 21.3 | 19.0 |
| 75% HACS (% CT) | 13.6 | 12.2 | 12.9 | 11.7 | 43.8 | 29.1 |

The data in Table 1 show that PEOP-2 when used in combination with NOPO-1 at levels up to 40 percent gives foam resiliency of 40 percent and higher. Comparative Samples A and C without NOPO-1 have resiliencies above 50 percent. Comparative example B based on PEOP-1 and 30 PHP of NOPO-1 is just above 40 percent resiliency hence will fail at 40 PHP. This shows that the equivalent weight of the polyether polyol is important in making a HR foam using a combination of natural oil based polyol and polyether polyol.

Example 4 and Comparative Samples D-F

Process A is used to prepare the foams described in Table 2:

TABLE 2

EXAMPLE 4 and Comparative Samples D-F

| | Example (EX) or Comparative Sample (CS) | | | |
|---|---|---|---|---|
| | EX 4 | CS D | CS E | CS F |
| PEOP-2 pphp | 70 | 100 | 100 | 100 |
| NOPO-1 pphp | 30 | | | |
| Water pphp | 3.5 | 3.5 | 3.5 | 3.5 |
| CAT-1 pphp | 0.5 | 0.5 | 0.5 | 0.5 |
| CAT-2 pphp | 0.4 | 0.4 | 0.4 | 0.4 |
| CAT-3 pphp | 0.05 | 0.05 | 0.05 | 0.05 |
| MOD-1 pphp | 1.5 | 1.5 | 1.5 | 1.5 |
| MOD-2 pphp | 2.0 | 2.0 | 2.0 | 2.0 |
| MOD-3 pphp | 1.0 | | | 1.0 |
| NCO-1 index | 80 | 80 | 90 | 90 |
| NCO-2 index | | | | |
| Mold exit time (s) | 69 | 63 | 59 | 58 |
| Demolding time (mi) | 4 | 4 | 4 | 4 |
| Part weight (g) | 422 | 421 | 414 | 421 |
| Comments | OK | OK | OK | OK |
| Core density kg/m³ | 45.6 | 45 | 45.7 | 46.4 |
| 50% CFD (KPa) | 4.3 | 4.0 | 5.4 | 5.5 |
| Airflow (cfm) | 2.8 | 3.3 | 3.0 | 3.3 |
| Resiliency (%) | 45 | 55 | 58 | 58 |
| 50% CS (% CD) | 10.8 | 5.4 | 5.7 | 6.1 |
| 75% CS (% CD) | 9.8 | 4.3 | 5.0 | 5.0 |
| 50% HACS (% CT) | 10.9 | 6.3 | 6.2 | 6.2 |
| 75% HACS (% CT) | 14.1 | 8.3 | 8.9 | 8.1 |

The data in Table 2 shows that foams with resiliency at 45 percent and low dry and humid aged Compression Sets can be obtained with PEOP-2 and 30 PHP NOPO-1. Properties of these foams are sufficiently close to those of the control CS D to satisfy typical OEM's specifications.

Examples 5-8

Process A is used to prepare the foams described in Table 3:

TABLE 3

EXAMPLES 5-8

| | Example (EX) or Comparative Sample (CS) | | | |
|---|---|---|---|---|
| | EX 5 | EX 6 | EX 7 | EX 8 |
| PEOP-2 pphp | 60 | 60 | 60 | 60 |
| PEOP-3 pphp | 10 | 10 | 10 | 10 |
| NOPO-1 pphp | 30 | 30 | 30 | 30 |
| Water pphp | 3.5 | 3.5 | 3.5 | 3.5 |
| CAT-1 pphp | 0.5 | 0.5 | 0.5 | 0.5 |
| CAT-2 pphp | 0.4 | 0.4 | 0 | |
| CAT-3 pphp | 0.05 | 0.05 | | |
| CAT-4 pphp | | | 0.4 | 0.4 |
| MOD-1 pphp | 1.5 | 1.5 | 1.5 | 1.5 |
| MOD-2 pphp | 2.0 | 2.0 | 2.0 | 2.0 |
| MOD-3 pphp | | 1.0 | | 1.0 |
| NCO-1 index | 85 | 85 | 85 | 85 |
| NCO-2 index | | | | |
| Mold exit time (s) | 65 | 68 | 83 | 79 |
| Demolding time (mi) | 4 | 4 | 4 | 4 |
| Part weight (g) | 423 | 424 | 427 | 426 |
| Comments | Slight tight | Slight tight | Foam sticky densification | Foam sticky Densification |
| Core density kg/m³ | 45.3 | 46.6 | 48.7 | 48.1 |
| 50% CFD (KPa) | 6.2 | 5.5 | 5.8 | 5.6 |
| Airflow (cfm) | 2.9 | 2.8 | 3.0 | 3.2 |
| Resiliency (%) | 42 | 43 | 43 | 44 |
| 50% CS (% CD) | 10.4 | 12.8 | 12.5 | 11.5 |
| 75% CS (% CD) | 9.5 | 11.3 | 10.3 | 11.0 |
| 50% HACS (% CT) | 10.5 | 10.3 | 12.0 | 10.2 |
| 75% HACS (% CT) | 13.2 | 13.5 | 14.4 | 13.4 |

The data in Table 3 shows that with the use of diol PEOP-3, foam properties are maintained. However CAT-1 (DMEA), while opening the foam, is less effective in curing the foam skin and in stabilizing the rising foam than CAT-2. Foam properties are however maintained.

Examples 9-12

Process A is used to prepare the foams described in Table 4:

TABLE 4

EXAMPLES 9-12

| | Example (EX) or Comparative Sample (CS) | | | |
|---|---|---|---|---|
| | EX 9 | EX 10 | EX 11 | EX 12 |
| PEOP-2 pphp | 70 | 70 | 70 | 70 |
| NOPO-2 pphp | 30 | | | |
| NOPO-3 pphp | | 30 | | |
| NOPO-4 pphp | | | 30 | |
| NOPO-5 pphp | | | | 30 |
| Water pphp | 3.5 | 3.5 | 3.5 | 3.5 |
| CAT-1 pphp | 0.5 | 0.5 | 0.5 | 0.5 |
| CAT-2 pphp | 0.4 | 0.4 | 0.4 | 0.4 |
| CAT-3 pphp | 0.05 | 0.05 | 0.05 | 0.05 |
| MOD-1 pphp | 1.5 | 1.5 | 1.5 | 1.5 |
| MOD-3 pphp | 1.0 | 1.0 | 1.0 | 1.0 |
| MOD-2 pphp | 2.0 | 2.0 | 2.0 | 2.0 |
| NCO-1 index | 85 | 85 | 85 | 85 |

TABLE 4-continued

EXAMPLES 9-12

| | Example (EX) or Comparative Sample (CS) | | | |
|---|---|---|---|---|
| | EX 9 | EX 10 | EX 11 | EX 12 |
| NCO-2 index | | | | |
| Mold exit time (s) | 71 | 73 | 69 | 72 |
| Demolding time (mi) | 5 | 5 | 5 | 5 |
| Part weight (g) | 417 | 413 | 420 | 418 |
| Comments | open | open | open | Open |
| Core density kg/m$^3$ | 46.6 | 46.9 | 47.4 | 47.2 |
| 50% CFD (KPa) | 4.3 | 4.6 | 4.8 | 4.6 |
| Airflow (cfm) | 3.2 | 3.2 | 3.2 | 2.0 |
| Resiliency (%) | 49 | 50 | 51 | 52 |
| 50% CS (% CD) | 8.2 | 6.4 | 6.3 | 6.1 |
| 75% CS (% CD) | 8.1 | 6.1 | 5.6 | 6.0 |
| 50% HACS (% CT) | 10.5 | 8.2 | 7.1 | 7.7 |
| 75% HACS (% CT) | 13.6 | 10.0 | 10.0 | 9.5 |

The data in Table 4 show that using PEOP-2 with NOPO-5 which has a higher molecular weight than NOPO-1 gives more open foam, higher foam resiliency and good dry and humid aged compression sets.

Examples 13-17 and Comparative Sample G

Process A is used to prepare the foams described in Table 5:

TABLE 5

EXAMPLES 13-17 and COMPARATIVE SAMPLE G

| | Example (EX) or Comparative Sample (CS) | | | | | |
|---|---|---|---|---|---|---|
| | CS G | EX 13 | EX 14 | EX 15 | EX 16 | EX 17 |
| PEOP-2 pphp | 100 | 90 | 80 | 70 | 60 | 50 |
| PEOP-1 pphp | | | | | | |
| NOPO-1 pphp | | 10 | 20 | 30 | 40 | 50 |
| Water pphp | 3.5 | 3.5 | 3.5 | 3.5 | 3.5 | 3.5 |
| CAT-1 pphp | 0.5 | 0.5 | 0.5 | 0.5 | 0.5 | 0.5 |
| CAT-2 pphp | 0.4 | 0.4 | 0.4 | 0.4 | 0.4 | 0.4 |
| CAT-3 pphp | 0.05 | 0.05 | 0.05 | 0.05 | 0.05 | 0.05 |
| MOD-1 pphp | 1.5 | 1.5 | 1.5 | 1.5 | 1.5 | 1.5 |
| MOD-2 pphp | 2.0 | 2.0 | 2.0 | 2.0 | 2.0 | 2.0 |
| NCO-1 index | 85 | 85 | 85 | 85 | 85 | 85 |
| NCO-2 index | | | | | | |
| Mold exit time (s) | 74 | 70 | 70 | 69 | 67 | 64 |
| Demolding time (mi) | 4 | 4 | 4 | 4 | 4 | 4 |
| Part weight (g) | 425 | 423 | 422 | 426 | 424 | 421 |
| Comments | | | | | | |
| Core density kg/m$^3$ | 46.3 | 46.6 | 48.7 | 46.1 | 47.7 | 45.8 |
| 50% CFD (KPa) | 5.2 | 5.5 | 5.8 | 6.0 | 5.3 | 6.2 |
| Airflow (cfm) | 3.1 | 2.9 | 3.1 | 2.6 | 2.7 | 2.2 |
| Resiliency (%) | 56 | 55.8 | 51 | 42 | 40 | 34 |
| 50% CS (% CD) | 7.1 | 8.2 | 9.1 | 11.9 | 15.9 | 20 |
| 75% CS (% CD) | 5.1 | 6.6 | 7.8 | 9.8 | 11.8 | 15.9 |
| 50% HACS (% CT) | 8.2 | 8.0 | 9.2 | 11.7 | 12.4 | 15 |
| 75% HACS (% CT) | 12.1 | 16.6 | 17.5 | 26.2 | 29.6 | 40.4 |

The data in Table 5 confirms that increasing the level of NOPO-1 in foam formulations leads to a reduction in foam resiliency. The foam of Example 17, for instance, would require a higher molecular weight polyol to reach 40 percent resiliency.

Examples 18-20

Process A is used to prepare the foams described in Table 6:

TABLE 6

EXAMPLES 18-20

| Example | 18 | 19 | 20 |
|---|---|---|---|
| PEPO-4 | 60 | 60 | 50 |
| PEPO-5 | 10 | 10 | 10 |
| PEPO-6 | 0 | 0 | 10 |
| NOPO-1 | 30 | 30 | 30 |
| Water | 4.1 | 4.1 | 3.5 |
| CAT-1 | 0.7 | 0 | 0.7 |
| CAT-2 | 0.3 | 0.3 | 0.3 |
| CAT-3 | 0.05 | 0.05 | 0 |
| CAT-4 | 0.1 | 0.1 | 0.1 |
| MOD-3 | 1.0 | 1.0 | 0.8 |
| NOC-3 (index) | 95 | 95 | 85 |
| Foam core density kg/m$^3$ | 34.5 | 33.8 | 40.4 |
| 50% CFD (KPa) | 5.6 | 5.3 | 5.0 |
| Ball rebound (%) | 52 | 49 | 53 |
| 75% CS | 16.3 | 19 | NA |
| 50% HACS | 28.7 | 28.8 | 33.2 |

Examples 18 to 20 show that a blend of TDI and PMDI gives foams based on natural oil based polyol with very good ball rebound values and acceptable compression sets. These foam pads were demolded after 6 minutes curing time. Example 20 illustrates a reduction in added catalyst (CAT-3) when an auto catalytic polyol (PEPO-6) is used.

Those skilled in the art will recognize that this invention is useful beyond the materials specified and exemplified in this application. For instance, the invention is applicable to natural oil based polyols other than the initiated fatty acid polyester alcohols exemplified, for instance suitable natural oil based polyols are believed to include those disclosed in such references as Grosch, G. H. et. al., WO0014045(A1) (Mar. 16, 2000); David M. Casper, US20060041155(A1), Aug. 23, 2004; David M. Casper and Trevor Newbold, US20060041156(A1); Ashvin Shah and Tilak Shah, WO 0104225(A1), (Jul. 12, 2000), Ron Herrington and Jeffrey Malsam, US20050070620(A1), (Jun. 25, 2004). Dwight E. Peerman and Edgar R. Rogier, EP106491 (Sep. 6, 1983); U.S. Pat. No. 4,496,487 (Sep. 7, 1982); U.S. Pat. No. 4,423,162 (Dec. 27, 1983); and U.S. Pat. No. 4,543,369 (Oct. 26, 1984); Zoran S. Petrovic et al.; US20060041157(A1), (Jun. 24, 2005).

Embodiments of the invention include the following:
1. A high resilience (HR) foam which is the reaction product of at least one natural oil based polyol and at least one polyisocyanate or derivative thereof having more than one isocyanate group, wherein the polyisocyanate comprises at least 5 weight percent methylene diphenyl diisocyanate.
2. A process of preparing an HR foam, comprising
    A) forming a reaction mixture including at least one polyol, at least one polyisocyanate, water, at least one catalyst wherein the polyol comprises at least one natural oil based polyol and wherein the polyisocyanate comprises at least 5 weight percent methylene diphenyl diisocyanate.
    B) subjecting the reaction mixture to conditions sufficient to result in the reaction mixture to expand and form an HR polyurethane foam.

3. An article comprising the foam of embodiment 1, a foam produced by the process of embodiment 2 or a combination thereof.
4. The foam, process or article of any of the preceding embodiments wherein the polyisocyanate comprises at least one methylene diphenyl diisocyanate or derivative thereof, preferably selected from isomers of diphenylmethanediisocyanate (MDI), derivatives of MDI such as biuret-modified "liquid" MDI products, polymeric MDI, (PMDI), MDI prepolymers and combinations thereof.
5. The foam, process or article of any of the preceding embodiments wherein the isocyanate comprises at least about any of 5, 10, 25, or 50 weight percent methylene diphenyl diisocyanate, preferably MDI or derivative thereof based on total weight of isocyanate compounds, independently preferably wherein the methylene diphenyl diisocyanate comprises at most about any of 90, 95 or 100 weight percent of the polyisocyanate, more preferably wherein the polyisocyanate is at least one methylene diphenyl diisocyanate, most preferably at least one MDI or derivative thereof.
6. The foam, process or article of any of the preceding embodiments wherein the isocyanate or combination thereof has an average of at least about any of 1.8, 2.0, 2.1, or 2.2, and preferably at most about any of 2.7, 2.5, of 2.3.
7. The foam, process or article of any of the preceding embodiments wherein the natural oil based polyol or combination thereof has at least about any of 2.2, 2.4, 2.6, or 2.8 to at most about any of 3, 4 or 5 hydroxyl groups per molecule.
8. The foam, process or article of any of the preceding embodiments wherein the natural oil based polyol (NOBP) has an equivalent weight at least sufficient to form a foam that exhibits a high resiliency, preferably a ball rebound of at least 40 percent, preferably an equivalent weight of at least about any of 500, 750, 1000, or 1200, to at most about any of 2500, 2000, or 1800 Daltons.
9. The foam, process or article of any of the preceding embodiments wherein the NOBP is at least one initiated fatty acid polyester alcohol, preferably wherein the initiator has an average of at least 2 active hydrogen groups per molecule, more preferably wherein the active hydrogen groups are selected from hydroxyl, primary amine, secondary amine or a combination thereof groups.
10. The foam, process or article of any of the preceding embodiments wherein the NOBP has an average of at least about 1.3 repeating units derived from fatty acids or esters per active hydrogen group on the initiator.
11. The foam, process or article of any of the preceding embodiments wherein at least one initiator is an alkoxylated glycerine, preferably which have a nominal functionality of 3, independently preferably which have an equivalent weight of preferably at least about any of 200, 300, or 400 and preferably to at most about any of 1500, 2000, or 1700; independently preferably the polyols have a level of unsaturation below about 0.09 meq/g.
12. The foam, process or article of any of the preceding embodiments wherein at least one NOBP is used in an admixture with at least one conventional or additional polyol, preferably wherein the NOBP or combination thereof comprises at least about any of 10, 15 or 20, preferably to at most about any of 20, 30 or 60 weight percent of the admixture of polyols used.
13. The foam, process or article of any of the preceding embodiments wherein at least one NOBP is used in an admixture with at least one additional polyol, preferably wherein the additional polyol has an equivalent weight at least sufficient to form a foam that exhibits a high resiliency, more preferably as determined by a ball rebound of at least 40 percent, most preferably an equivalent weight of at least about any of 1700, 1800, or 1900, most preferably to at most about any of 2500, 2100 or 2000 Daltons.
14. The foam, process or article of any of the preceding embodiments wherein at least one NOBP is used in an admixture with at least one additional polyol, preferably wherein the additional polyol has sufficient hydroxyl groups per molecule to form a foam that exhibits a high resiliency, more preferably as determined by a ball rebound of at least 40 percent, most preferably an at least about any of 2, 2.2, 2.5, or 2.8, most preferably to at most about any of 3.4, 3 or 2.9 hydroxyl groups per molecule.
15. The foam, process or article of any of the preceding embodiments wherein at least one NOBP is used in an admixture with at least one additional polyol, preferably wherein the additional polyol has an unsaturation level of less than about 0.09 meq/g.
16. The foam, process or article of any of the preceding embodiments wherein at least one NOBP is used in an admixture with at least one conventional or additional polyol, preferably wherein the additional polyol or combination thereof comprises at least about any of 40, 45 or 50, preferably to at most about any of 60, 80, 90 weight percent of the admixture of polyols used.
17. The foam, process or article of any of the preceding embodiments wherein at least one natural oil based polyol is selected from at least one of (a) initiated fatty acid polyester alcohol, (b) castor and soy epoxide product, (c) secondary alcohol alkoxylation product, (d) other alkoxylated natural oil compounds or (e) any selection or combination of (a), (b), (c) and (d).
18. The foam, process or article of any of the preceding embodiments wherein the natural oil based polyol is an alkoxylated natural oil polyol wherein the alkoxylating agent is an alkylene oxide, preferably selected from ethylene oxide, propylene oxide or a combination thereof.
19. The foam, process or article of any of the preceding embodiments wherein at least one conventional polyether polyol is selected from a polyether polyol, a polyester polyol or a combination thereof.
20. The foam, process or article of any of the preceding embodiments wherein at least one polyol, preferably the natural oil based polyol, has primary hydroxyl groups, more preferably at least any of 20, 50, 75, 80, 85, 90, 95 or 100 percent primary hydroxyl groups.
21. The foam, process or article of any of the preceding embodiments wherein water is used to make the foam in an amount of from any of 2.0, 2.5, 3.0, or 3.5 to any of 10, 8, 6, 5 pphp based on weight of the total combined polyol components.
22. The foam, process or article of any of the preceding embodiments wherein a blowing agent other than, or preferably in addition to water is used, preferably selected from hydrocarbons, hydrofluorocarbons, carbon dioxide or combinations thereof.
23. The foam, process or article of any of the preceding embodiments wherein pressure of less than atmospheric, preferably down to 0.5 Bar is used in making the foam.

24. The foam, process or article of any of the preceding embodiments wherein the isocyanate or combination thereof is used in an amount corresponding to an isocyanate index from at least about any of 55, 65, 95 to any of 125, 115, 105.

25. The foam, process or article of any of the preceding embodiments wherein a prepolymer is formed between at least a portion of the isocyanate and at least a portion of the polyol.

26. The foam, process or article of any of the preceding embodiments wherein a prepolymer is formed from at least a portion of the isocyanate and at least a portion of the natural oil based polyol and optionally at least a portion of the additional polyol.

27. The foam, process or article of any of the preceding embodiments wherein a prepolymer is formed from at least a portion of the isocyanate and at least a portion of the additional polyol and optionally at least a portion of the natural oil based polyol.

28. The foam, process or article of any of the preceding embodiments wherein the foam is formed in the presence of at least one gelling catalyst and at least one blowing catalyst.

29. The foam, process or article of any of the preceding embodiments wherein the catalysts are selected from amine and tin catalysts, preferably wherein the tin catalyst is stannous octoate, dibutyltin dilaurate or a combination thereof, more preferably in one embodiment dibutyltin dilaurate, more preferably in another embodiment stannous octoate; preferably wherein only one amine catalyst is used.

30. The foam, process or article of any of the preceding embodiments wherein the foam is formed in the presence of at least one surfactant or compatibilizer.

31. The foam, process or article of any of the preceding embodiments wherein either a chain extender or a crosslinker, preferably both, are substantially absent or avoided.

32. The foam, process or article of any of the preceding embodiments wherein water is the only blowing agent used.

33. The foam, process or article of any of the preceding embodiments wherein water is used with at least one additional blowing agent.

34. The foam, process or article of any of the preceding embodiments wherein the foam is produced by a process comprising the steps of (a) forming a natural oil based polyol composition comprising at least about 10 weight percent of at least one natural oil based polyol having an OH functionality of at least about 2.2 and an equivalent weight of at least about 500 Dalton (Da) and at least about 40 weight percent of at least one conventional polyol having an equivalent weight of at least about 1700 Da and water; (b) admixing at least one catalyst with the natural oil based polyol composition to form a catalyst polyol admixture; (c) supplying a poly isocyanate comprising at least about 5 weight percent of at least one methylene diphenyl diisocyanate isomer, derivative or combination thereof in an amount corresponding to an isocyanate index of at least about 55 and at most about 105 and (c) admixing the isocyanate with the catalyst polyol admixture.

35. The foam, process or article of any of the preceding embodiments wherein the foam advantageously has at least one of, preferably at least 2, more preferably at least 3, most preferably 4 of the following (a) a density as determined according to the procedures of ASTM D 3574-01 Test A of at least about any of 25, 30, 35, preferably to about any of 80, 55 or 50 kg/m$^3$;
(b) a resiliency as determined according to the procedures of ASTM D 3574, test H of at least about any of 40, 42, or 48, preferably to 50 percent; or
(c) a dry 75 percent compression set at measured according to the procedures of ASTM D 3574, test I of at most about any of 30, 25, 20, 15 or 10 percent.

36. The foam, process or article of any of the preceding embodiments wherein the foam is used in comfort applications, mattresses, pillows, seating, sound absorption, vibration dampening, harshness dampening, packaging, bumper pads, sports equipment, medical equipment, safety equipment, helmet liners, pilot seats, earplugs, noise dampening, or a combination thereof.

The invention claimed is:

1. A high resilience polyurethane foam comprising the reaction product of (1) at least one polyisocyanate comprising at least about 5 weight percent of at least one methylene diphenyl diisocyanate isomer, derivative or a combination thereof, (2) an admixture of at least one natural oil based polyol and at least one additional polyol which is not a natural oil based polyol, wherein the admixture comprises at least about 10 weight percent natural oil based polyol and at least about 40 weight percent additional polyol having an equivalent weight of at least about 1700 Daltons, the foam has a resiliency indicated by a ball rebound of at least 40 percent as measured according to the procedures of ASTM D 3574, Test H, and the at least one natural oil based polyol comprises a reaction product of an initiator and at least one hydroxymethylated fatty acid or hydroxymethylated fatty acid ester, wherein the initiator comprises at least one alcohol or amine containing compound containing two or more hydroxyl, primary amine or secondary amine groups that has been reacted with an alkoxylating agent so that the initiator comprises polyether groups and has a molecular weight of at least about 150-3000, and (3) water.

2. The foam of claim 1 wherein the natural oil based polyol has at least one of (a) a hydroxyl functionality of at least about 2.2 or (b) an equivalent weight of at least about 500 Da or a combination thereof.

3. The foam of claim 1 wherein the isocyanate is used at an isocyanate index of from 55 to 105.

4. The foam of claim 1 wherein a prepolymer is formed between at least a portion of the isocyanate and at least a portion of the polyol.

5. The foam of claim 4 wherein the prepolymer is formed from at least a portion of the isocyanate and at least a portion of the natural oil based polyol and optionally at least a portion of the additional polyol.

6. The foam of claim 4 wherein the prepolymer is formed from at least a portion of the isocyanate and at least a portion of the additional polyol and optionally at least a portion of the natural oil based polyol.

7. A process wherein a high resilience foam is produced by a process comprising the steps of (a) forming a natural oil based polyol composition comprising at least about 10 weight percent of at least one natural oil based polyol having an OH functionality of at least about 2.2 and an equivalent weight of at least about 500 Dalton (Da) and at least about 40 weight percent of at least one conventional polyol having an equivalent weight of at least about 1700 Da and water, wherein the at least one natural oil based polyol comprises a reaction product of an initiator and at least one hydroxymethylated fatty acid or hydroxymethylated fatty acid ester, wherein the initiator comprises at least one alcohol or amine containing compound containing two or more hydroxyl, primary amine or secondary amine groups that has been reacted with an alkoxylating agent so that the initiator comprises polyether groups and has a molecular weight of at least about 150-3000; (b) admixing at least one catalyst with the natural oil based polyol composition to form a catalyst polyol admixture; (c) supplying a poly isocyanate comprising at least about 5 weight percent of at least one methylene diphenyl diisocyanate isomer, derivative or combination thereof in an amount corresponding to an isocyanate index of at least about 55 and at most about 105 and (c) admixing the isocyanate with the catalyst polyol admixture.

8. An article comprising the foam of claim 1.

9. The article of claim 8 which comprises at least one comfort application, mattress, pillow, seating, sound absorption, vibration dampening, harshness dampening, packaging, bumper pad, sports equipment, medical equipment, safety equipment, helmet liner, pilot seat, earplug, noise dampening application, or a combination thereof.

10. An article comprising the foam made according to the process of claim 7.

11. The article of claim 10 which comprises at least one comfort application, mattress, pillow, seating, sound absorption, vibration dampening, harshness dampening, packaging, bumper pad, sports equipment, medical equipment, safety equipment, helmet liner, pilot seat, earplug, noise dampening application, or a combination thereof.

* * * * *